EDWARD RILEY.
Improvement in the Manufacture of Cutters for Barbed Nails.
No. 121,964. Patented Dec. 19, 1871.

Witnesses.
L. H. Burridge.
L. L. Humphrey.

Inventor.
E. Riley.
per Burridge & Co.
Attys.

UNITED STATES PATENT OFFICE.

EDWARD RILEY, OF CLEVELAND, OHIO.

IMPROVEMENT IN THE MANUFACTURE OF CUTTERS FOR BARBED NAILS.

Specification forming part of Letters Patent No. 121,964, dated December 19, 1871.

*To all whom it may concern:*

Be it known that I, EDWARD RILEY, of Cleveland, in the county of Cuyahoga and State of Ohio, have invented a certain new and Improved Mode of Making Cutters for Barbed Nails; and I do hereby declare that the following is a full, clear, and complete description thereof, reference being had to the accompanying drawing making part of the same.

Figure 1:
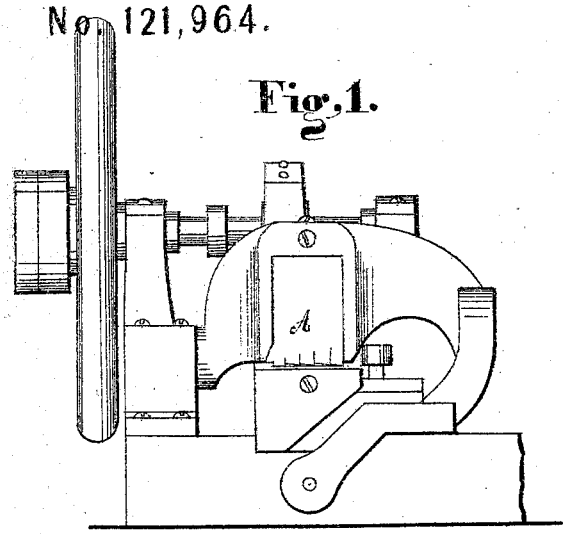
Figure 2:
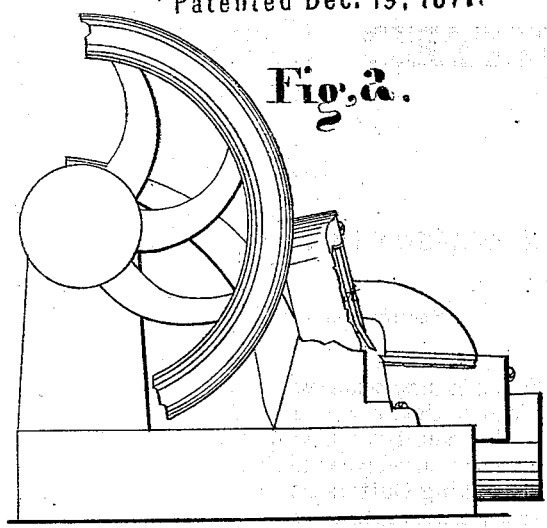
Figure 3:
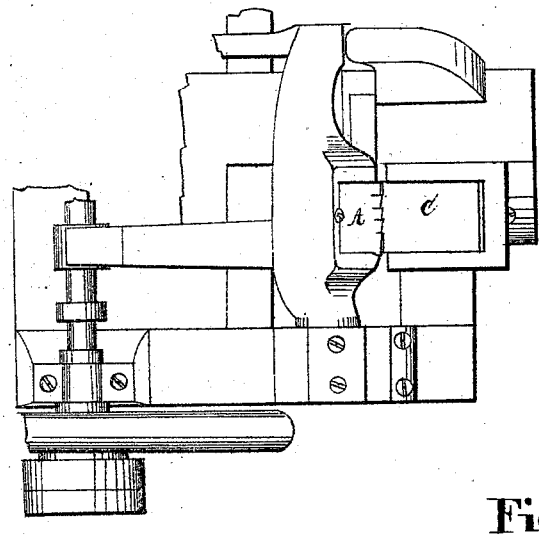
Figure 4:
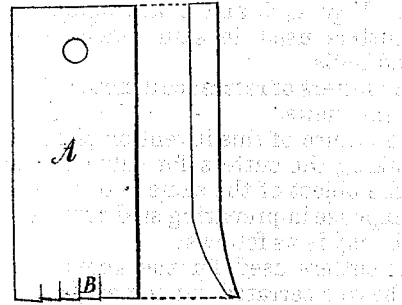
Figure 5:
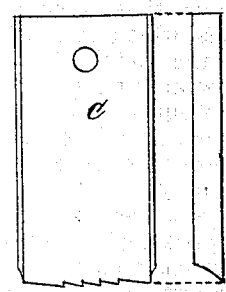
Figure 6:
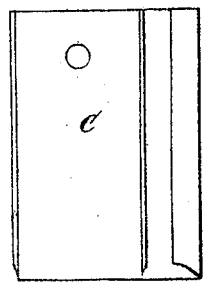

Figure 1 is a front view of a section of a nail-machine. Fig. 2 is a side view. Fig. 3 is a plan view. Figs. 4, 5, and 6 are detached views of the cutters used in said machine for making barbed nails.

Like letters of reference denote like parts in the different views.

The nature of this invention relates to the way of making the cutters for cutting barbed nails; and the object of the same is to save time, labor, and expense in preparing said cutters for use, and which way is as follows:

The cutters used for the above-specified purpose have a serrated cutting-edge corresponding in number and size to the barbs of the nail. Said serrations in the edge of the cutters are heretofore made in filing them in, which is a matter requiring much time, labor, and experience in the use of files, which, in consequence of the hard nature of the metal of which the cutters are made soon wear out the file, and as the cutters need to be frequently sharpened and refitted, it is, therefore, a work requiring much time, labor, and expense to keep the cutters in good working condition.

Much care is also required to so file the serrations in the two sets of cutters that they shall correspond in exact relation to each other, to avoid lapping or cutting upon themselves, which, if thus permitted to do, they usually injure each other by breaking out or nicking the cutting-edges.

To avoid this trouble, expense, time, and labor, I make the serrations in the cutters as follows: I take a cutter—say the movable one A, Fig. 1, a detached view of which is shown in Fig. 4—and carefully make the serrations B thereon in the usual way, which, on being done, the cutter is then transferred and placed in the machine, as shown in Fig. 1, as it would be for ordinary use. I then take a blank for the bed-cutter C, Fig. 3, a detached view of which is shown in Fig. 5; said blank is then placed in the bed of the machine, as shown in said Fig. 3, as for ordinary use. The serrations are then cut in the edge thereof by the movable cutter A, by causing said cutter to work as for cutting the nail-plate.

In this way the serrations in the bed-cutter are easily made, and to faithfully correspond to those in the active one, and which is done in a few minutes of time, whereas if done in the usual way, by the use of the file, it would take several hours, and if the cutters are of large size it is a day's work to fit them up, and then not done nearly so well for the reason that it is found to be very difficult to so file the serrations in both cutters that they shall fit into each other without interfering, which interference sometimes so injures the cutting-edges that they have to be reduced soon after being used.

The serrations of the cutters when made in this way are more perfect in shape than filed ones for the reason that the bottom of the serrations and edges thereof are slightly concave, transversely corresponding to the curvilineal motion of the active cutter.

This concave character cannot well be given to the bed-cutter by filing; hence the face of the cutter is straight transversely, and so also is the face of the active one, which should be slightly convex, in order to work closely in its relation with the bed-cutter.

In consequence of the faces of the cutters being straight transversely they are liable to rub upon each other when worked as close together as they should be and thereby injure the edges. The serrations in the active cutter are made by cutting them in by the bed-cutter, which is, in effect, the same as cutting the serrations in the bed-cutter by the movable one, as above described, and in either case the work is done in a few minutes; whereas when done by the file in the usual way it requires many hours to fit them up, and when done they are less perfect than when made by my method.

What I claim as my invention, and desire to secure by Letters Patent, is—

The herein-described method of forming the serrations in the cutters for cutting barbed nails by cutting said serrations in the edge of the cutters, substantially in the manner set forth.

EDWARD RILEY.

Witnesses:
 W. H. BURRIDGE,
 J. H. BURRIDGE.